(12) United States Patent
Izutani et al.

(10) Patent No.: US 10,788,412 B2
(45) Date of Patent: Sep. 29, 2020

(54) OPTICAL MEASUREMENT APPARATUS, AND OPTICAL MEASUREMENT METHOD

(71) Applicant: OTSUKA ELECTRONICS CO., LTD., Hirakata-shi, Osaka (JP)

(72) Inventors: Yusuke Izutani, Hirakata (JP); Ikuo Wakayama, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 133 days.

(21) Appl. No.: 16/015,349

(22) Filed: Jun. 22, 2018

(65) Prior Publication Data

US 2019/0011351 A1 Jan. 10, 2019

(30) Foreign Application Priority Data

Jul. 5, 2017 (JP) .................................. 2017-132206

(51) Int. Cl.
| | |
|---|---|
| *G01N 15/14* | (2006.01) |
| *G01B 11/08* | (2006.01) |
| *G01N 15/02* | (2006.01) |
| *G01N 21/51* | (2006.01) |
| *G01N 21/53* | (2006.01) |
| *G01N 21/01* | (2006.01) |
| *G01N 15/00* | (2006.01) |

(52) U.S. Cl.
CPC ......... *G01N 15/1434* (2013.01); *G01B 11/08* (2013.01); *G01N 15/0211* (2013.01); *G01N 21/51* (2013.01); *G01N 21/53* (2013.01); *G01N 2015/03* (2013.01); *G01N 2015/1493* (2013.01); *G01N 2021/015* (2013.01); *G01N 2201/024* (2013.01); *G01N 2201/0245* (2013.01)

(58) Field of Classification Search
CPC ............... G01B 11/08; G01N 15/0211; G01N 15/1434; G01N 2015/03; G01N 2015/1493; G01N 2021/015; G01N 21/51; G01N 21/53; G01N 2201/024; G01N 2201/0245
USPC .......................... 356/335–343, 244, 247–255
See application file for complete search history.

(56) References Cited

U.S. PATENT DOCUMENTS

| | | | |
|---|---|---|---|
| 5,234,665 | A | 8/1993 | Ohta et al. |
| 7,087,885 | B1 | 8/2006 | Yamaguchi |
| 2002/0176801 | A1 | 11/2002 | Giebeler et al. |

(Continued)

FOREIGN PATENT DOCUMENTS

| | | |
|---|---|---|
| JP | 3533502 B2 | 5/2004 |
| JP | 3689278 B2 | 8/2005 |
| JP | 2009-293987 A | 12/2009 |

*Primary Examiner* — Tri T Ton
(74) *Attorney, Agent, or Firm* — Keating and Bennett, LLP

(57) ABSTRACT

An optical measurement apparatus includes a main body base, an optical base movably combined with the main body base, a measurement optical system fixed to the optical base, and an optical base moving mechanism which moves the optical base relative to the main body base. The optical base moving mechanism moves the optical base relative to the main body base between an internal measurement position and an external measurement position. A measurement object position of the measurement optical system coincides with an internal measurement object position within the main body base. The measurement object position of the measurement optical system coincides with an external measurement object position outside the main body base.

13 Claims, 10 Drawing Sheets

(56) References Cited

U.S. PATENT DOCUMENTS

2008/0151265 A1\* 6/2008 Vin ................. G03B 27/58
  356/616
2016/0077015 A1\* 3/2016 Holmes ............ G01N 33/50
  506/9

\* cited by examiner

OPTICAL MEASUREMENT APPARATUS, AND OPTICAL MEASUREMENT METHOD

CROSS REFERENCE TO RELATED APPLICATIONS

This application claims the benefit of priority to Japanese Patent Application No. 2017-132206 filed on Jul. 5, 2017. The entire contents of this application are hereby incorporated herein by reference.

BACKGROUND OF THE INVENTION

1. Field of the Invention

The present invention relates to an apparatus and a method for performing optical measurement on a measurement object.

2. Description of the Related Art

JP3533502 discloses an automatic chemical analyzer including a turntable which holds a plurality of light measurement cells annularly arranged, a light source disposed adjacent to the turntable, and a detection unit also disposed adjacent to the turntable. The light source and the detection unit constitute a spectrometry section. The spectrometry section performs spectroscopic measurement on one of the plural light measurement cells held on the turntable. The turntable is turned to change the light measurement cell to be subjected to the measurement. Thus, the plural light measurement cells are sequentially subjected to the measurement.

SUMMARY OF THE INVENTION

The apparatus disclosed in JP3533502 incorporates the turntable and, therefore, has a larger size, a larger footprint, a greater number of components and a complicated construction, requiring higher production costs. This correspondingly increases the price of the apparatus. Some users who need not sequentially perform the measurement on a multiplicity of measurement objects may consider that an apparatus without the turntable is desirable.

Therefore, makers of the apparatus prepare at least two models respectively designed with and without the turntable, and manufacture and sell these models.

However, the preparation of the plural models increases the designing costs and, in addition, the apparatus makers need to prepare components dedicated for the respective models. On the other hand, if a user purchases the model without the turntable and, thereafter, a need arises to sequentially perform the measurement on a multiplicity of measurement objects, the user has to additionally buy the model with the turntable. This increases the user's economic burden.

Problems similar to those associated with the turntable will occur when different measurement object holding members should be prepared according to the types of measurement objects.

Preferred embodiments of the present invention provide optical measurement apparatuses and optical measurement methods each of which are adaptable for various users' needs.

One preferred embodiment of the present invention provides an optical measurement apparatus including a main body base, an optical base movably combined with the main body base, a measurement optical system fixed to the optical base, and an optical base moving mechanism which moves the optical base relative to the main body base. The optical base moving mechanism moves the optical base relative to the main body base between an internal measurement position and an external measurement position. The internal measurement position is defined such that a measurement object position of the measurement optical system coincides with an internal measurement object position set within the main body base (more specifically, within a housing of the optical measurement apparatus). The external measurement position is defined such that the measurement object position of the measurement optical system coincides with an external measurement object position outside the main body base (more specifically, outside the housing of the optical measurement apparatus).

The measurement optical system may emit light to the measurement object position and detect light scattered from the measurement object position. More specifically, the measurement optical system may include a light source which generates the light to be emitted to the measurement object position, a projection lens which concentrates the light generated by the light source on the measurement object position, and a detection lens on which the light scattered from the measurement object position is incident. In this case, the measurement object position is defined at or around a focal position of the projection lens.

The movement of the optical base relative to the main body base includes one or both of parallel movement and rotational movement. The direction of the parallel movement includes one or both of a horizontal directional component and a vertical directional component. The rotational movement may be rotation about a rotation axis extending in a direction including one or both of a horizontal directional component and a vertical directional component.

According to one preferred embodiment of the present invention, the optical measurement apparatus further includes a sample stage which is supported by the main body base and retains a sample holder to hold a sample. The internal measurement object position corresponds to the position of the sample held by the sample holder.

The sample holder includes a structure to hold a sample cell which contains the sample.

According to one preferred embodiment of the present invention, the optical measurement apparatus further includes a sample stage moving mechanism which moves the sample stage relative to the main body base. The sample stage moving mechanism moves the sample stage relative to the main body base between a measurement stage position defined such that the sample held by the sample holder is located at the internal measurement object position and a retracted stage position defined such that measurement at the external measurement object position by the measurement optical system is not prevented.

According to one preferred embodiment of the present invention, the optical base moving mechanism moves the optical base between the internal measurement position and the external measurement position along a first direction along which the optical base is moved toward and away from the sample held by the sample holder (e.g., linearly as seen in plan). Further, the sample stage moving mechanism moves the sample stage between the measurement stage position and the retracted stage position along a second direction intersecting the first direction (e.g., linearly as seen in plan).

According to one preferred embodiment of the present invention, the sample stage includes an attach/detach mechanism that removably attaches the sample holder to the sample stage. The sample stage preferably includes a structure to replaceably retain a first sample holder which holds a single sample (e.g., which holds a single sample cell) and a second sample holder which holds a plurality of samples (e.g., which holds a plurality of sample cells).

According to one preferred embodiment of the present invention, the sample holder includes a structure to hold a plurality of samples (e.g., to hold a plurality of sample cells) in alignment along the second direction on the sample stage. The sample stage moving mechanism moves the sample stage so that an arbitrary one of the plural samples (e.g., an arbitrary one of the plural sample cells) is located at the internal measurement object position.

According to one preferred embodiment of the present invention, the optical measurement apparatus further includes an external measurement base that is connectable to the main body base, and an external sample holder supported by the external measurement base. The external sample holder holds a sample so as to exhibit (locate) the sample at the external measurement object position when the external measurement base is attached to the main body base. The external sample holder may hold a container containing the sample or to hold the sample via a piping through which the sample flows.

According to one preferred embodiment of the present invention, the external sample holder is structured to hold a plurality of samples. The optical measurement apparatus further includes an external sample moving mechanism which moves the external sample holder on the external measurement base to exhibit (locate) an arbitrary one of the plural samples at the external measurement object position.

According to one preferred embodiment of the present invention, the external sample holder is structured to hold a beaker or a test tube containing a sample or to hold a piping member through which a fluid sample flows.

According to one preferred embodiment of the present invention, the measurement optical system emits the light to the measurement object position, detects the light scattered from the measurement object position, and outputs a detection signal corresponding to the detected scattered light (e.g., an optical signal or an electric signal). The optical measurement apparatus further includes a particle diameter analyzer which analyzes particle diameters of particles contained in the sample placed at the measurement object position of the measurement optical system based on the detection signal outputted by the measurement optical system.

According to one preferred embodiment of the present invention, the particle diameter analyzer analyzes the particle diameters by a dynamic light scattering method.

One preferred embodiment of the present invention provides a method for performing optical measurement on a sample by using the optical measurement apparatus according to any of the preferred embodiments of the present invention described above. The optical measurement may be performed by measuring particle diameters by the dynamic light scattering method.

More specifically, one preferred embodiment of the present invention provides an optical measurement method using an optical measurement apparatus which includes a main body base, an optical base movably combined with the main body base, and a measurement optical system fixed to the optical base. The method includes the step of moving the optical base relative to the main body base to locate a measurement object position of the measurement optical system at an external measurement object position outside the main body base (more specifically, outside a housing of the optical measurement apparatus). The method includes the step of locating a sample at the external measurement object position. The method includes the step of acquiring a detection signal from the measurement optical system with the measurement object position of the measurement optical system being located at the external measurement object position and with the sample being located at the external measurement object position.

According to one preferred embodiment of the present invention, the measurement object position of the measurement optical system is movable between an internal measurement object position set within the main body base (more specifically, within the housing of the optical measurement apparatus) and the external measurement object position by moving the optical base relative to the main body base. The optical measurement apparatus may include a sample stage which is supported by the main body base and retains a sample holder to hold the sample. The optical measurement method includes the step of retracting the sample stage from a measurement stage position defined such that the sample is exhibited at the internal measurement object position.

According to one preferred embodiment of the present invention, the measurement optical system emits light to the measurement object position, detects light scattered from the measurement object position, and outputs a detection signal corresponding to the detected scattered light (e.g., an optical signal or an electric signal). The optical measurement method further includes the step of analyzing particle diameters of particles contained in the sample based on the signal outputted by the measurement optical system.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
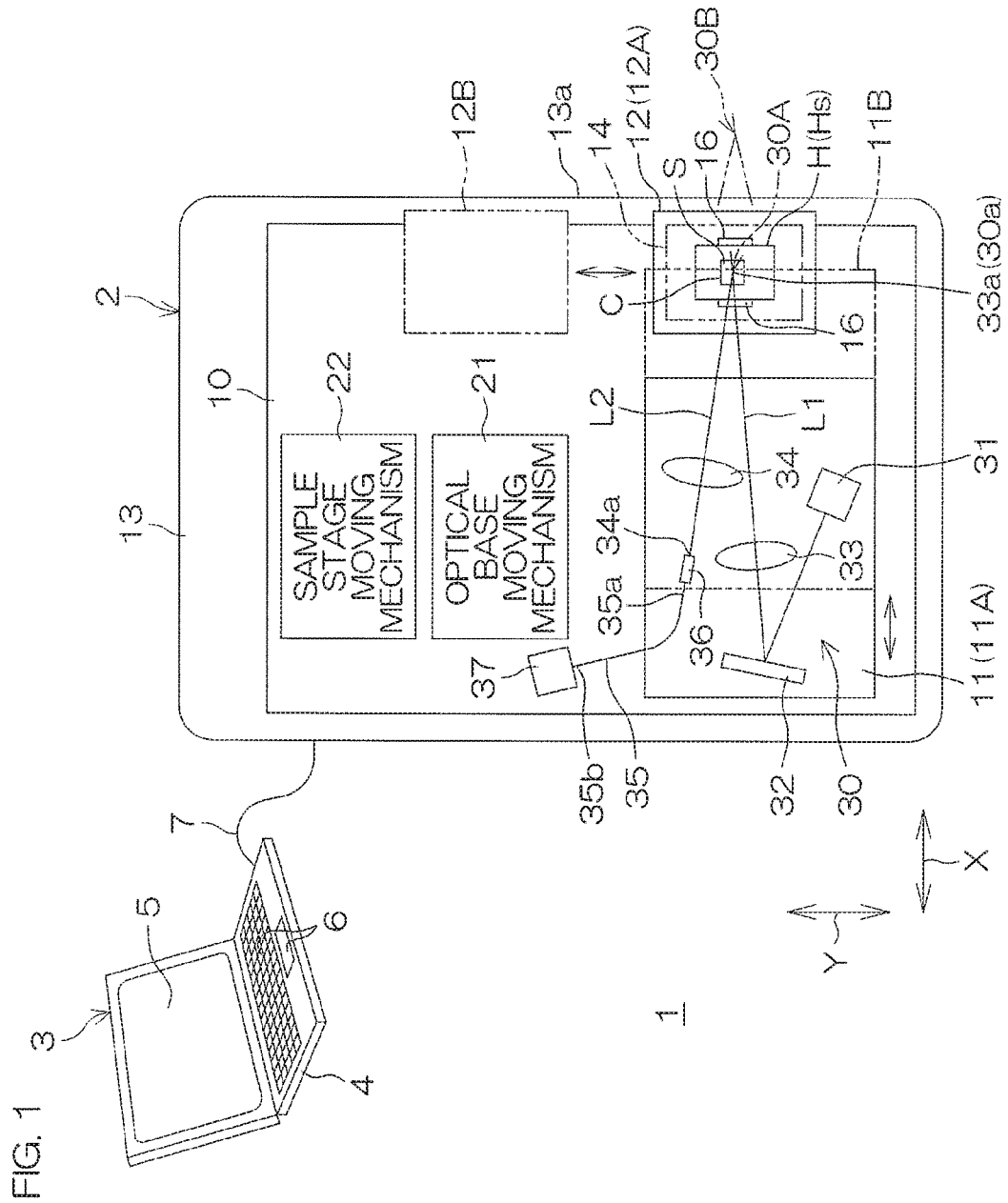
FIG. 1 is a schematic plan view showing the construction of an optical measurement apparatus according to a first preferred embodiment of the present invention.

FIG. 1 is a schematic plan view showing the construction of an optical measurement apparatus according to a first preferred embodiment of the present invention. The optical measurement apparatus 1 includes a scattered light detector 2, and a processor 3 connected to the scattered light detector 2. The processor 3 may be provided in the form of computer, for example. The processor 3 may be configured or programmed to function as a controller to control the scattered light detector 2 and as an analyzer to analyze the properties of a measurement object based on an output of the scattered light detector 2. The processor 3 includes a processor main body 4, a display device 5 and an operating device 6. The operating device 6 includes input devices such as a keyboard and a pointing device. The scattered light detector 2 and the processor 3 are connected to each other via a communication cable 7.

The scattered light detector 2 includes a main body base 10, an optical base 11 and a sample stage 12, which are accommodated in a housing 13. The main body base 10 may be a member partly or entirely separate from the housing 13. Further, the main body base 10 may be a part of the housing 13. That is, the housing 13 may define the main body base 10.

The scattered light detector 2 further includes an optical base moving mechanism 21 which moves the optical base 11 relative to the main body base 10. The scattered light detector 2 further includes a sample stage moving mechanism 22 which moves the sample stage 12 relative to the main body base 10. The optical base 11 is combined with the main body base 10 movably along a horizontal X-direction (first direction). The optical base moving mechanism 21 moves the optical base 11 along the X-direction. In this preferred embodiment, the X-direction is parallel or substantially parallel to an edge of the rectangular housing 13 as seen in plan (e.g., parallel or substantially parallel to an edge of a front surface of the apparatus). The sample stage 12 is combined with the main body base 10 movably along a horizontal Y-direction (second direction) intersecting the X-direction as seen in plan (intersecting perpendicularly to the X-direction in this preferred embodiment). The sample stage moving mechanism 22 moves the sample stage 12 along the Y-direction. The Y-direction is parallel or substantially parallel to another edge of the rectangular housing 13 as seen in plan (e.g., parallel or substantially parallel to an edge of a side surface of the apparatus).

A measurement optical system 30 is fixed to the optical base 11. The measurement optical system 30 includes a plurality of optical components, which are fixed to the optical base 11. That is, the optical base 11 collectively supports the plural optical components of the measurement optical system 30. The optical base 11 may have a plate shape, or may have a box shape. The optical base 11 and the plural optical components supported by the optical base 11 may define a measurement optical system module. The plural optical components include a light source 31, a mirror 32, a projection lens 33 and a detection lens 34. The light source 31 may be, for example, a laser light source and may include a semiconductor laser device. The light source 31 may emit light at a variable wavelength.

The light emitted from the light source 31 is reflected on the mirror 32 toward the projection lens 33, which directs the light to a focal position 33a thereof on an optical axis thereof and concentrates the light on the focal position 33a to form irradiation light L1 to be used for irradiation of a sample S. A dimmer to adjust the light amount may be provided at a proper position on a light path extending from the light source 31 to the projection lens 33.

A measurement object position 30a of the measurement optical system 30 is defined at and around the focal position 33a of the projection lens 33. With the sample S located at the measurement object position 30a, the irradiation light L1 is scattered by the sample S. As a result, scattered light L2 is generated.

The detection lens 34 is fixed to the optical base 11 so that its optical axis intersects the optical axis of the projection lens 33. The detection lens 34 directs the scattered light L2 from the sample S to a focal position 34a thereof on an optical axis thereof and concentrates the scattered light L2 on the focal position 34a. An inlet end 35a of an optical fiber 35 is located at the focal position 34a. The inlet end 35a of the optical fiber 35 is fixed to the optical base 11 by a fiber fixture 36.

An outlet end 35b of the optical fiber 35 is optically coupled with a detector 37. The detector 37 includes a photoelectric convertor. The detector 37 outputs a detection signal (electric signal) corresponding to a received light amount. In this preferred embodiment, the detector 37 is accommodated in the housing 13 outside the optical base 11. Alternatively, the detector 37 may be fixed on the optical base 11 to be an element of the measurement optical system 30 fixed on the optical base 11. In this case, a light receiving surface of the detector 37 is preferably located at the focal position 34a of the detection lens 34 without the provision of the optical fiber 35.

Figure 7:
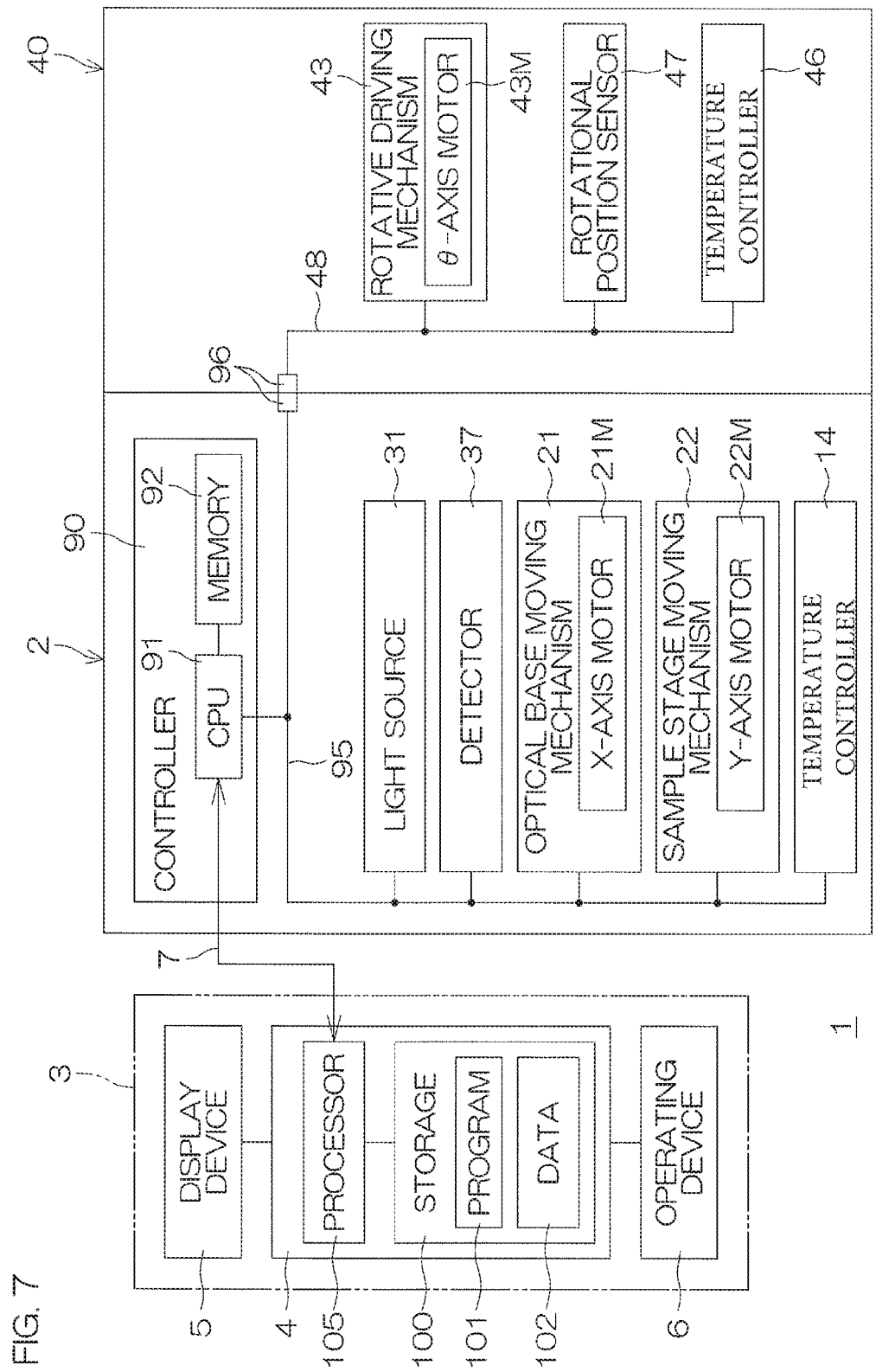
FIG. 7 is a block diagram for explaining the electrical configuration of the optical measurement apparatus.

The detection signal outputted from the detector 37 is inputted to a controller 90 (see FIG. 7). The controller 90 performs an A/D conversion (analog-to-digital conversion) of the detection signal, and performs an arithmetic operation on the thus converted detection signal. The result of the arithmetic operation is inputted from the controller 90 to the processor 3 via the communication cable 7.

The optical base 11 is movable along the X-direction between an internal measurement position 11A and an external measurement position 11B.

When the optical base 11 is present in the internal measurement position 11A, the measurement object position 30a of the measurement optical system 30 coincides with an internal measurement object position 30A set within the housing 13. In other words, the internal measurement position 11A of the optical base 11 is defined such that the measurement object position 30a of the measurement optical system 30 coincides with the internal measurement object position 30A. The internal measurement object position 30A is not necessarily required to be a single position, but may include a plurality of different X-direction positions (plural discrete positions) or may be a zonal position continuously extending along the X-direction (continuous position).

When the optical base 11 is present in the external measurement position 11B, on the other hand, the measurement object position 30a of the measurement optical system 30 coincides with an external measurement object position 30B set outside the housing (particularly, outside the housing 13 as seen in plan). In other words, the external measurement position 11B of the optical base 11 is defined such that the measurement object position 30a of the measurement optical system 30 coincides with the external measurement object position 30B. The external measurement object position 30B is not necessarily required to be a single position, but may include a plurality of different X-direction positions (plural discrete positions) or may be a zonal position continuously extending along the X-direction (continuous position).

Thus, the optical measurement apparatus 1 has an internal measurement mode in which the measurement object position 30a of the measurement optical system 30 is located at the internal measurement object position 30A, and an external measurement mode in which the measurement object position 30a of the measurement optical system 30 is located at the external measurement object position 30B.

The sample stage 12 includes an attach/detach mechanism 16 to removably attach a sample holder H to the sample stage 12. The attach/detach mechanism 16 is structured to position and retain the sample holder H at a predetermined position on the sample stage and, as required, to bring the sample holder H out of the retention state. The sample holder H holds a sample cell C. The sample cell C contains a sample S. The sample cell C is made of a material, such as glass or a transparent resin, capable of transmitting light of a wavelength generated by the light source 31. The sample cell C may be a square tubular container having a rectangular plan shape. The sample S is typically liquid. Particularly, a liquid sample S containing fine particles dispersed therein may be contained in the sample cell C.

Figure 2:
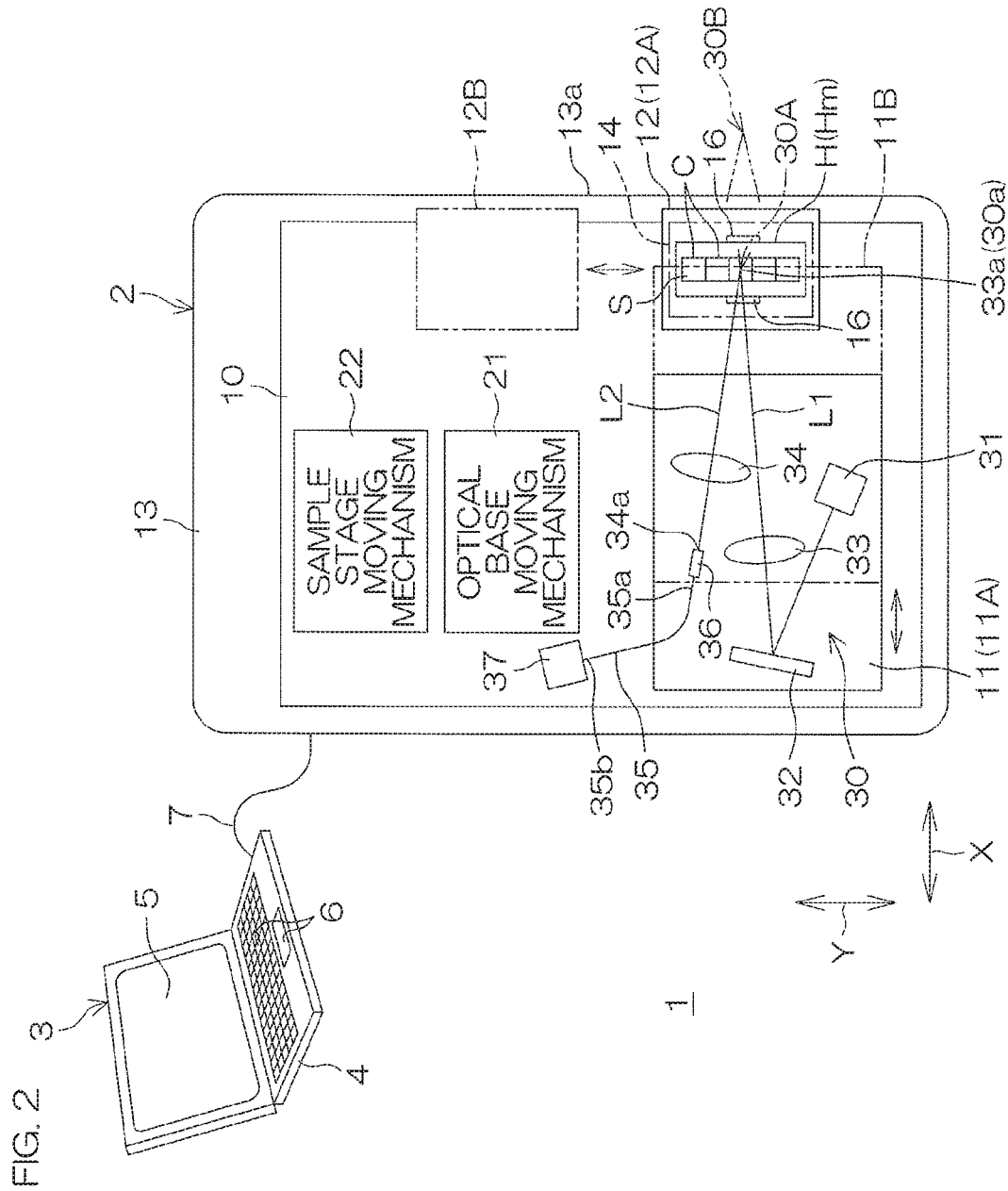
FIG. 2 is a schematic plan view showing an arrangement using a plural-cell holder.

FIG. 1 shows a sample holder H of a single-cell type (single-cell holder Hs) to hold a single sample cell C at a time. As shown in FIG. 2, a sample holder H of a plural-cell type (plural-cell holder Hm) to simultaneously hold a plurality of sample cells C may be attached to the sample stage 12. That is, the attach/detach mechanism 16 is able to selectively attach the single-cell holder Hs or the plural-cell holder Hm to the sample stage 12 as needed or desired. The attach/detach mechanism 16 thus permits the sample stage 12 to retain the sample holder H in a replaceable manner.

The plural-cell holder Hm is structured to hold the plural sample cells C (e.g., five sample cells in FIG. 2) in alignment along one direction (i.e., in linear alignment as seen in plan). With the plural-cell holder Hm attached to the sample stage 12, the plural sample cells C are aligned along the Y-direction.

The sample cell C held by the single-cell holder Hs and the sample cells C held by the plural-cell holder Hm may be different in shape. More specifically, the single-cell holder Hs may be designed to hold a relatively large sample cell C, and the plural-cell holder Hm may be designed to hold relatively small sample cells C. The smaller sample cells C are advantageous in that the measurement is able to be performed on a smaller amount of the sample S.

The sample stage 12 includes a temperature controller 14 which controls the temperature of the sample cell C held by the sample holder H (more specifically, the temperature of the sample S contained in the sample cell C).

The sample stage 12 is supported by the main body base 10 so that the sample S is movable along the Y-direction along a path extending through the internal measurement object position 30A. The sample stage moving mechanism 22 moves the sample stage 12 along the Y-direction between a measurement stage position 12A and a retracted stage position 12B.

When the sample stage 12 is present in the measurement stage position 12A, the Y-direction position of the sample S contained in the sample cell C held by the sample holder H coincides with the internal measurement object position 30A. In other words, the measurement stage position 12A is defined such that the sample position coincides with the internal measurement object position 30A. The measurement stage position 12A is not necessarily required to be a single position, but may include a plurality of different Y-direction positions (plural discrete positions) or may be a zonal position continuously extending along the Y-direction (continuous position).

When the single-cell holder Hs is used, the measurement stage position 12A is located at a Y-direction position such that the position of the sample S contained in the single sample cell C held by the single-cell holder Hs coincides with the internal measurement object position 30A. When the plural-cell holder Hm is used, the measurement stage position 12A includes plural Y-direction positions such that the samples S respectively contained in the plural sample cells C held by the plural-cell holder Hm each coincide with the internal measurement object position 30A.

On the other hand, the retracted stage position 12B is a position to which the sample stage 12 is retracted from the measurement stage position 12A along the Y-direction. When the optical base 11 is to be located in the external measurement position 11B, the sample stage 12 is retracted along the Y-direction so as not to interfere with the optical base 11. The Y-direction position of the sample stage 12 at this time is defined as the retracted stage position 12B.

The housing 13 of the scattered light detector 2 has a rectangular shape as seen in plan. An outer surface of the housing corresponding to one edge of the rectangular shape (a side surface of the housing 13 in this preferred embodiment) serves as an external measurement base connection surface 13a to connect (directly or indirectly connecting) an external measurement base to the main body base 10 as required. The external measurement base connection surface 13a intersects the X-direction (in this preferred embodiment, intersects perpendicularly to the X-direction). The external measurement base connection surface 13a is preferably a generally flat vertical surface. Particularly, at least a portion of the external measurement base connection surface 13a to be connected to the external measurement base preferably has a flat surface linearly extending substantially without undulations as seen in plan. The internal measurement object position 30A and the external measurement object position 30B are respectively located on opposite sides of the external measurement base connection surface 13a inside and outside the housing 13. That is, the measurement object position 30a of the measurement optical system 30 is moved across the external measurement base connection surface 13a between the inside and the outside of the housing 13 by the movement of the optical base 11 along the X-direction.

FIGS. 3, 4, 5 and 6 respectively illustrate exemplary optional devices each having an external measurement base connectable to the external measurement base connection surface 13a.

Figure 3:
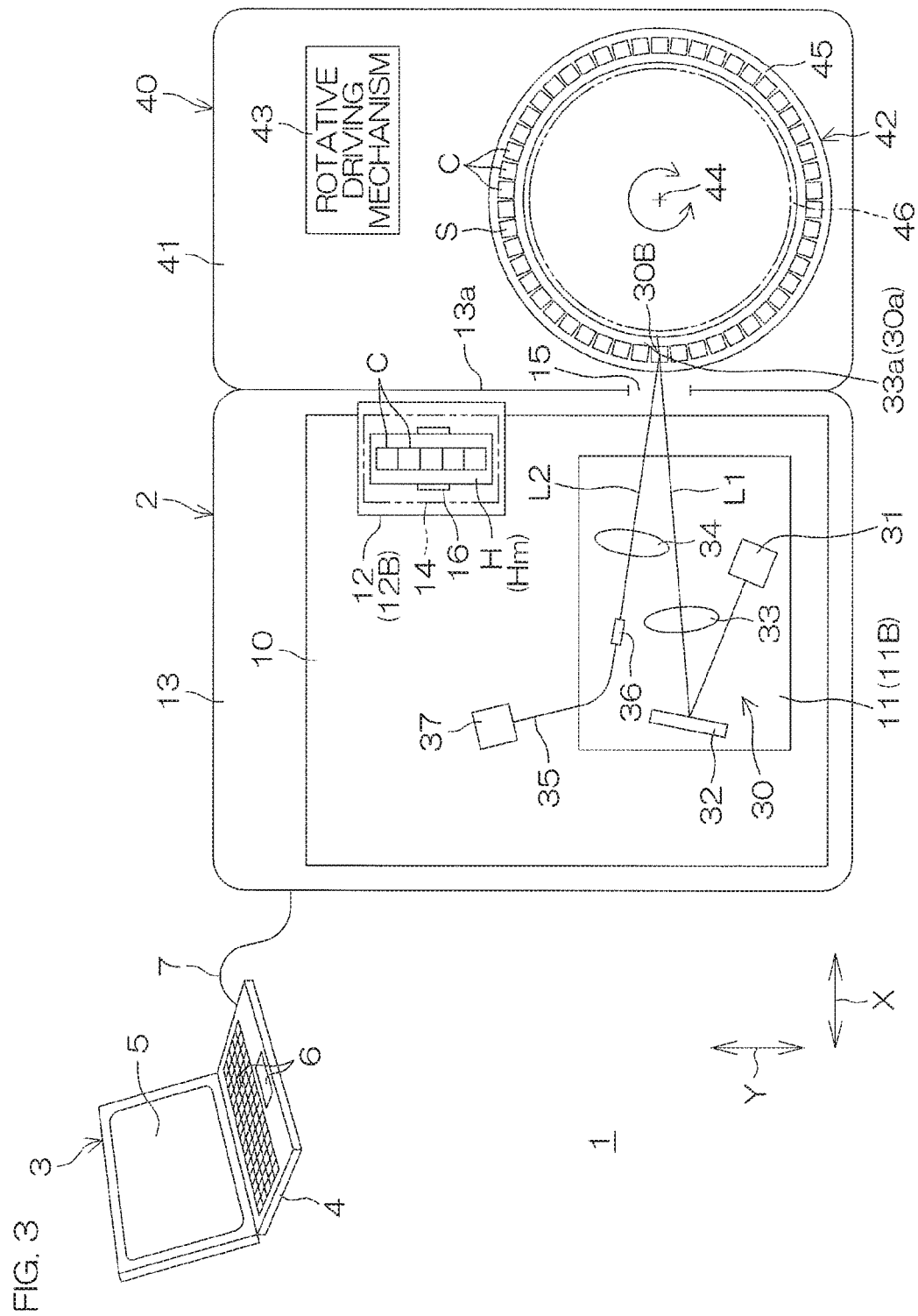
FIG. 3 is a schematic plan view showing an arrangement with an autosampler connected thereto.

FIG. 3 shows an exemplary configuration including an autosampler 40 connected to the external measurement base connection surface 13a. The autosampler 40 includes an external measurement base 41 to be fixed to the external measurement base connection surface 13a, and a turntable 42 rotatably supported by the external measurement base 41. The turntable 42 is turned about a vertically extending rotation axis by a rotative driving mechanism 43. The rotative driving mechanism 43 is an example of the external sample moving mechanism. The turntable 42 includes a sample holder portion 45 which holds a plurality of sample cells C arranged annularly circumferentially about the rotation axis 44. The turntable 42 is an example of the external sample holder. With the autosampler 40 connected to the external measurement base connection surface 13a, the circumference of the turntable 42 extends through the external measurement object position 30B. Therefore, the plural sample cells C are able to be sequentially located at the external measurement object position 30B by turning the turntable 42. As a result, samples S contained in the respective sample cells C are each able to be exhibited at the external measurement object position 30B. The external measurement object position 30B may be located inward of an inner surface of the sample cell C or may be located in an interface between the inner surface of the sample cell C and the sample S. The turntable 42 may further include a temperature controller 46 to control the temperature of the sample cells C held by the sample holder portion 45 (for heating and/or cooling the sample cells C).

Figure 4:
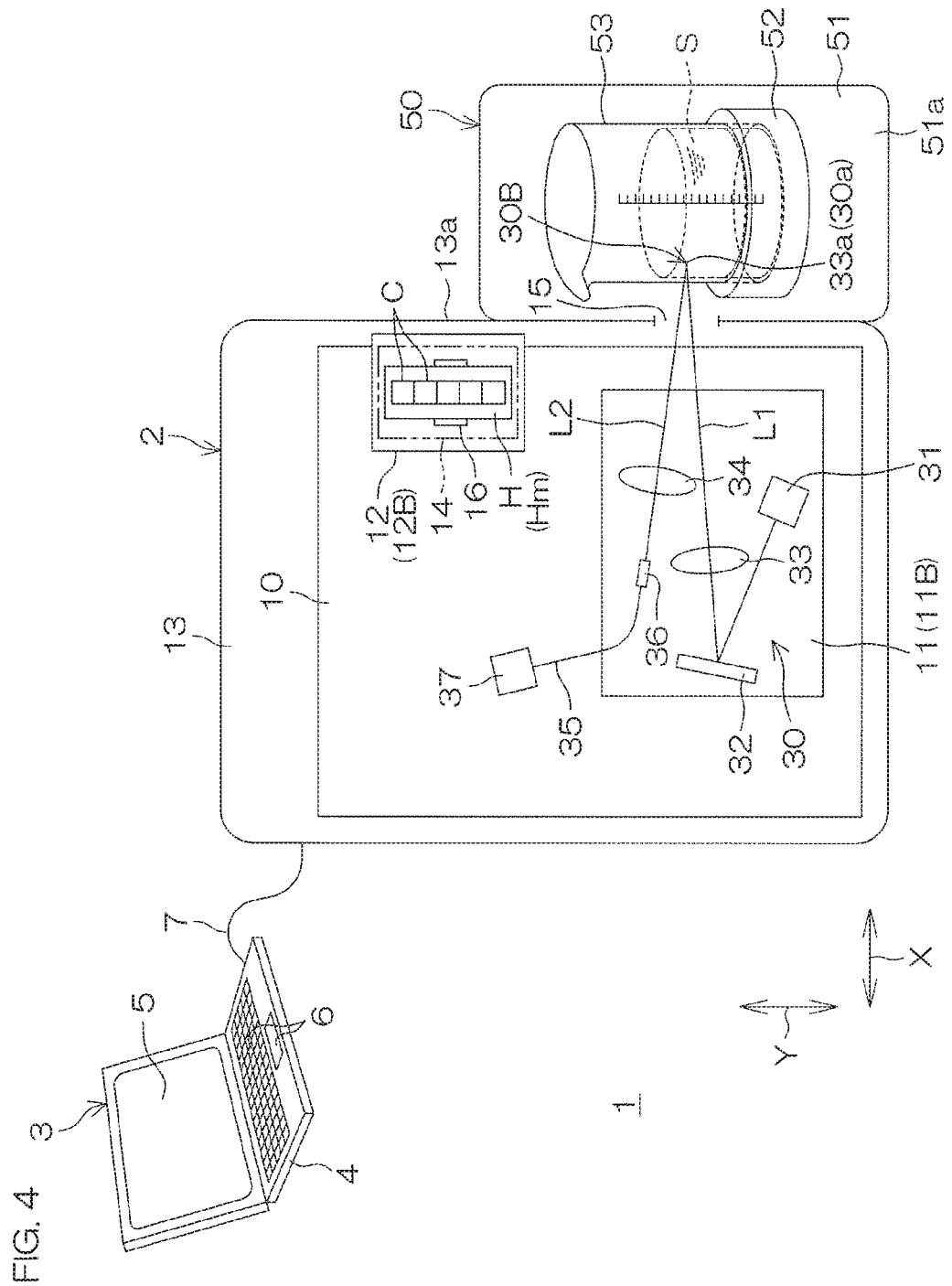
FIG. 4 is a schematic plan view showing an arrangement with a beaker holder connected thereto.

FIG. 4 shows an exemplary configuration including a beaker holder 50 connected to the external measurement base connection surface 13*a*. The beaker holder 50 is able to hold a beaker 53 containing a sample S. The beaker holder 50 includes an external measurement base 51 to be fixed to the external measurement base connection surface 13*a*, and a positioning member provided as the external sample holder on the external measurement base 51. The external measurement base 51 includes a horizontal placement surface 51*a* on which the beaker 53 is placed. The positioning member 52 restricts the position of the beaker 53 on the placement surface 51*a*, and may be an annular member including an inner wall surface conformable to the side surface of the beaker 53. The beaker 53 containing the sample S is located at the position restricted by the positioning member 52 such that the sample S contained in the beaker 53 is able to be exhibited at the external measurement object position 30B. The external measurement object position 30B may be located inward of an inner surface of the beaker 53 in the beaker 53 or may be located in an interface between the inner surface of the beaker 53 and the sample S. The beaker 53 is made of a material capable of transmitting light generated by the light source 31, more specifically, made of glass or a transparent resin.

Figure 5:
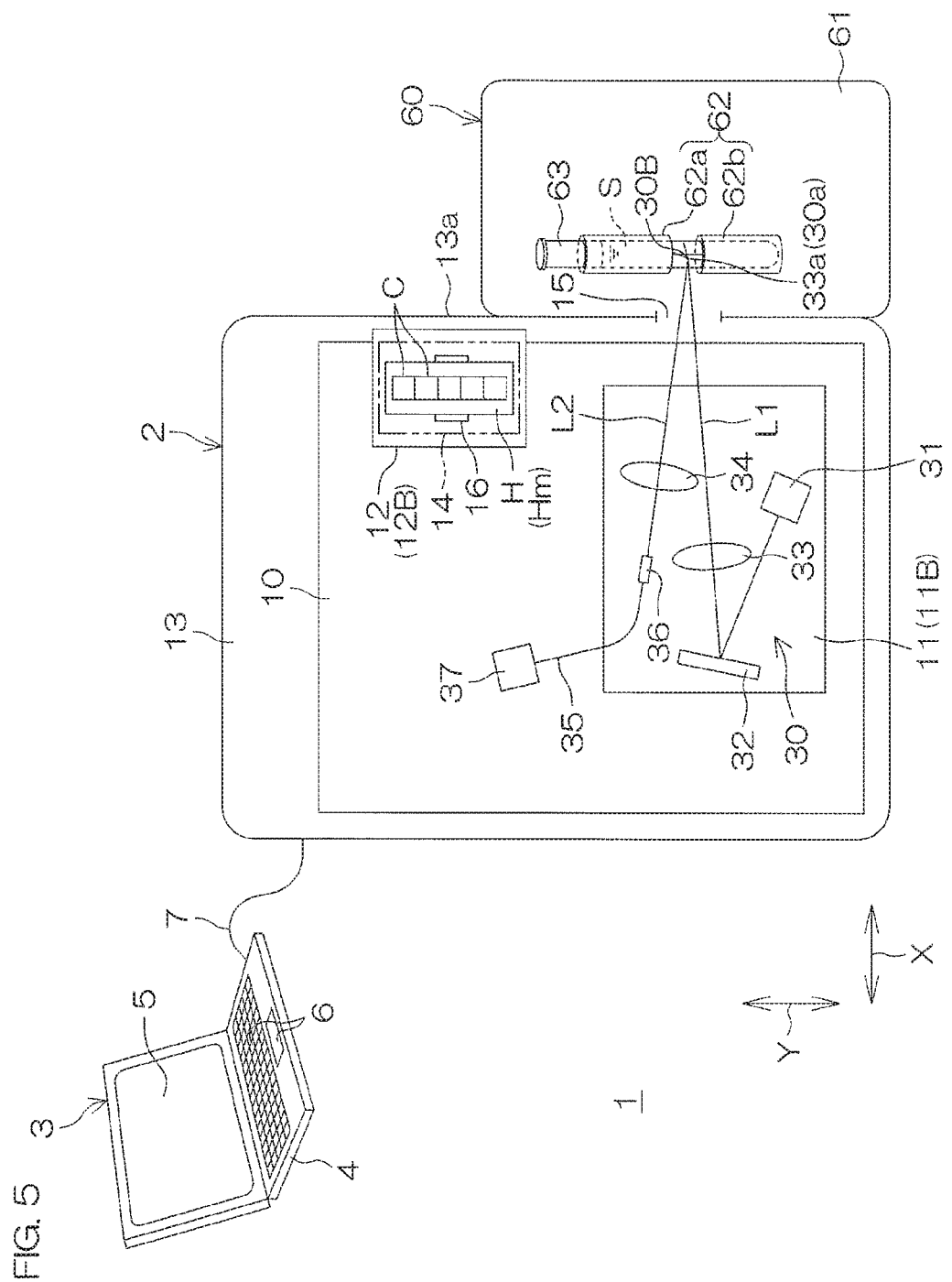
FIG. 5 is a schematic plan view showing an arrangement with a test tube holder connected thereto.

FIG. 5 shows an exemplary configuration including a test tube holder 60 connected to the external measurement base connection surface 13*a*. The test tube holder 60 is able to hold a test tube 63 containing a sample S. The test tube holder 60 includes an external measurement base 61 to be fixed to the external measurement base connection surface 13*a*, and a positioning member 62 provided as the external sample holder on the external measurement base 61. The positioning member 62 restricts the position of the test tube 63, and may include a pair of tubular portions 62*a*, 62*b* aligned in vertically spaced relation. The test tube 63 containing the sample S is placed in the positioning member 62 as extending through the pair of tubular portions 62*a*, 62*b*. Thus, the sample S contained in the test tube is able to be exhibited at the external measurement object position 30B. The external measurement object position 30B may be located inward of an inner surface of the test tube 63 in the test tube 63 or may be located in an interface between the inner surface of the test tube 63 and the sample S. The test tube 63 is made of a material, such as glass or a transparent resin, capable of transmitting the light generated by the light source 31.

Figure 6:
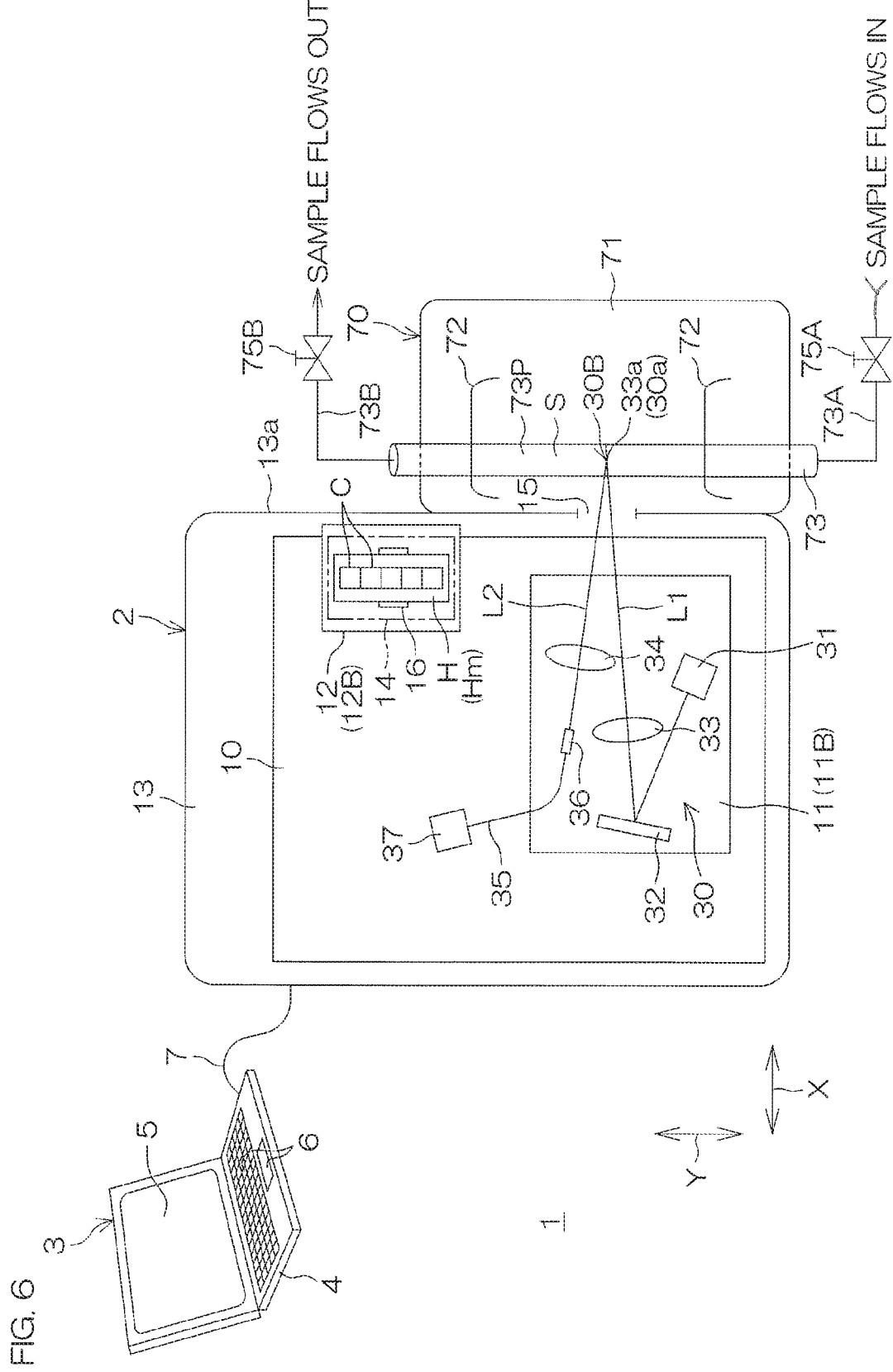
FIG. 6 is a schematic plan view showing an arrangement with a piping holder connected thereto.

FIG. 6 shows an exemplary configuration including a piping holder 70 connected to the external measurement base connection surface 13*a*. The piping holder 70 is able to hold a piping 73 through which a sample S flows. The piping holder 70 includes an external measurement base 71 to be fixed to the external measurement base connection surface 13*a*, and a piping fixture 72 provided as the external sample holder on the external measurement base 71. The piping fixture 72 restricts the position of the piping 73. The piping 73 through which the sample S flows is positioned and fixed by the piping fixture 72 such that the sample S flowing through the piping 73 is able to be exhibited at the external measurement object position 30B. The piping 73 is made of a material, such as glass or a transparent resin, capable of transmitting the light generated by the light source 31. The external measurement object position 30B may be located inward of an inner surface of the piping 73 in the piping 73 or may be located in an interface between the inner surface of the piping 73 and the sample S.

For example, the piping fixture 72 may include a pair of piping fixtures 72 provided in vertically spaced relation. The piping 73 is fixed by these piping fixtures 72 to have a sample exhibiting portion 73P extending vertically linearly between the pair of piping fixtures 72. The piping 73 includes a sample inlet portion 73A connected to one of opposite sides (preferably a lower side) of the sample exhibiting portion 73P, and a sample outlet portion 73B connected to the other side (preferably an upper side) of the sample exhibiting portion 73P. An inlet on-off valve 75A is provided in the sample inlet portion 73A, and an outlet on-off valve 75B is provided in the sample outlet portion 73B. The on-off valves 75A, 75B may be electromagnetic valves which are controllable by the controller 90 (see FIG. 7).

When the measurement is performed on the sample S, the on-off valves 75A, 75B may be controlled to be closed to stop the flow of the sample S in the sample exhibiting portion 73P. Particularly, when particle diameters are measured by a dynamic light scattering method as will be described later, it is preferred to close the on-off valves 75A, 75B to stop the flow of the sample S. In this preferred embodiment, the sample exhibiting portion 73P is disposed vertically upright and, hence, a flow path of the sample exhibiting portion 73P has a height difference between opposite sides of the external measurement object position 30B. Therefore, air bubbles trapped in the sample S move upward away from the external measurement object position 30B, so that the measurement is able to be accurately performed with an influence of the air bubbles being significantly reduced or prevented. Particularly, where the sample inlet portion 73A is connected to the lower side of the sample exhibiting portion 73P and the sample outlet portion 73B is connected to the upper side of the sample exhibiting portion 73P, the air bubbles smoothly move upward after the on-off valves 75A, 75B are closed. The on-off valves 75A, 75B are preferably gradually closed by gradually reducing the opening degrees of the on-off valves 75A, 75B, rather than abruptly closed. This reduces an impact due to the abrupt closing of the on-off valves 75A, 75B, making it possible to stabilize the state of the sample S in a short period of time after the closing of the on-off valves 75A, 75B. The on-off valves 75A, 75B may be opened and closed simultaneously, or may be opened and closed in a time staggered manner.

In the arrangements shown in FIGS. 3 to 6, the external measurement base connection surface 13*a* includes a window 15 through which the irradiation light L1 directed from the projection lens 33 to the external measurement object position 30B and the scattered light L2 directed from the external measurement object position 30B to the detection lens 34 are transmitted. The window 15 is an opening provided in the housing 13. A transparent plate of a light transmissive material may be fitted in the opening. Where the scattered light detector 2 is used alone without any of the external measurement bases 41, 51, 61, 71 connected thereto as shown in FIG. 1 or 2, there is no need to provide the window 15 in the housing 13.

FIG. 7 is a block diagram for explaining the electrical configuration of the optical measurement apparatus according to this preferred embodiment with the autosampler 40 connected thereto (also see FIG. 3).

The scattered light detector 2 includes the controller 90. The controller 90 includes a CPU (central processing unit)

91 and a memory 92. The memory 92 stores programs to be executed by the CPU 91. Further, the memory 92 provides a work area to be used by the CPU 91 for arithmetic operations. The memory 92 is further used for temporarily storing signals and other data detected by the detector 37 of the scattered light detector 2 and temporarily storing a command and data sent from the processor 3.

Internal sensors and actuators are connected to the controller 90 via an internal signal line 95 of the scattered light detector 2. More specifically, the light source 31, the detector 37, the optical base moving mechanism 21, the sample stage moving mechanism 22, the temperature controller 14 and the like are connected to the internal signal line 95. The controller 90 controls the light source 31, the optical base moving mechanism 21, the sample stage moving mechanism 22 and the temperature controller 14 via the internal signal line 95. Further, the controller 90 acquires output signals of the detector 37 via the internal signal line 95.

The light source 31 includes a laser light source (e.g., semiconductor laser element) to be controlled by the controller 90. The light source 31 may be controlled by the controller 90 to control an output, an irradiation wavelength and other output properties.

The optical base moving mechanism 21 may include an electric motor (hereinafter referred to as "X-axis motor") 21M as an actuator to be controlled by the controller 90. The sample stage moving mechanism 22 may include an electric motor (hereinafter referred to as "Y-axis motor") 22M as an actuator to be controlled by the controller 90.

The temperature controller 14 may include a heater, a Peltier element, an air cooling fan and the like as actuators to be controlled by the controller 90.

In the exemplary configuration shown in FIG. 7, the internal signal line 95 is connected to an internal signal line 48 of the autosampler 40 via a connector 96. Therefore, the controller 90 of the scattered light detector 2 is able to acquire output signals of sensors provided in the autosampler 40 and to control actuators provided in the autosampler 40.

The rotative driving mechanism 43 and the temperature controller 46 are connected to the internal signal line 48 of the autosampler 40. The rotative driving mechanism 43 may include an electric motor (hereinafter referred to as "θ-axis motor") 43M as an actuator to be controlled by the controller 90. Further, the temperature controller 46 may include a heater, a Peltier element, an air cooling fan and the like as actuators to be controlled by the controller 90. Further, the autosampler 40 may include a rotational position sensor 47 (an example of the sensor) which detects the rotational position of the turntable 42. The rotational position sensor 47 is connected to the internal signal line 48.

The controller 90 is further connected to the processor 3 via the communication cable 7, and is configured or programmed to send and receive control signals and data to and from the processor 3.

With this arrangement, the respective portions of the scattered light detector 2 and the autosampler 40 are able to be actuated according to the commands from the processor 3, and the processor 3 is able to acquire output signals of the scattered light detector 2.

The processor 3 is preferably provided in the form of computer as described above, for example. A program(s) to perform the measurement with the use of the optical measurement apparatus 1 is preliminarily prepared. A user executes the program(s) on the processor 3 to perform the measurement with the use of the optical measurement apparatus 1. The processor 3 includes a storage 100 serving as media to store a program 101 and data 102, and a processor (CPU) 105 which executes the program 101. The processor 105 executes the program 101 causing the processor 3 to function as a controller to control the scattered light detector 2 and the like and function as an analyzer to analyze the output signals of the scattered light detector 2.

Figure 8:
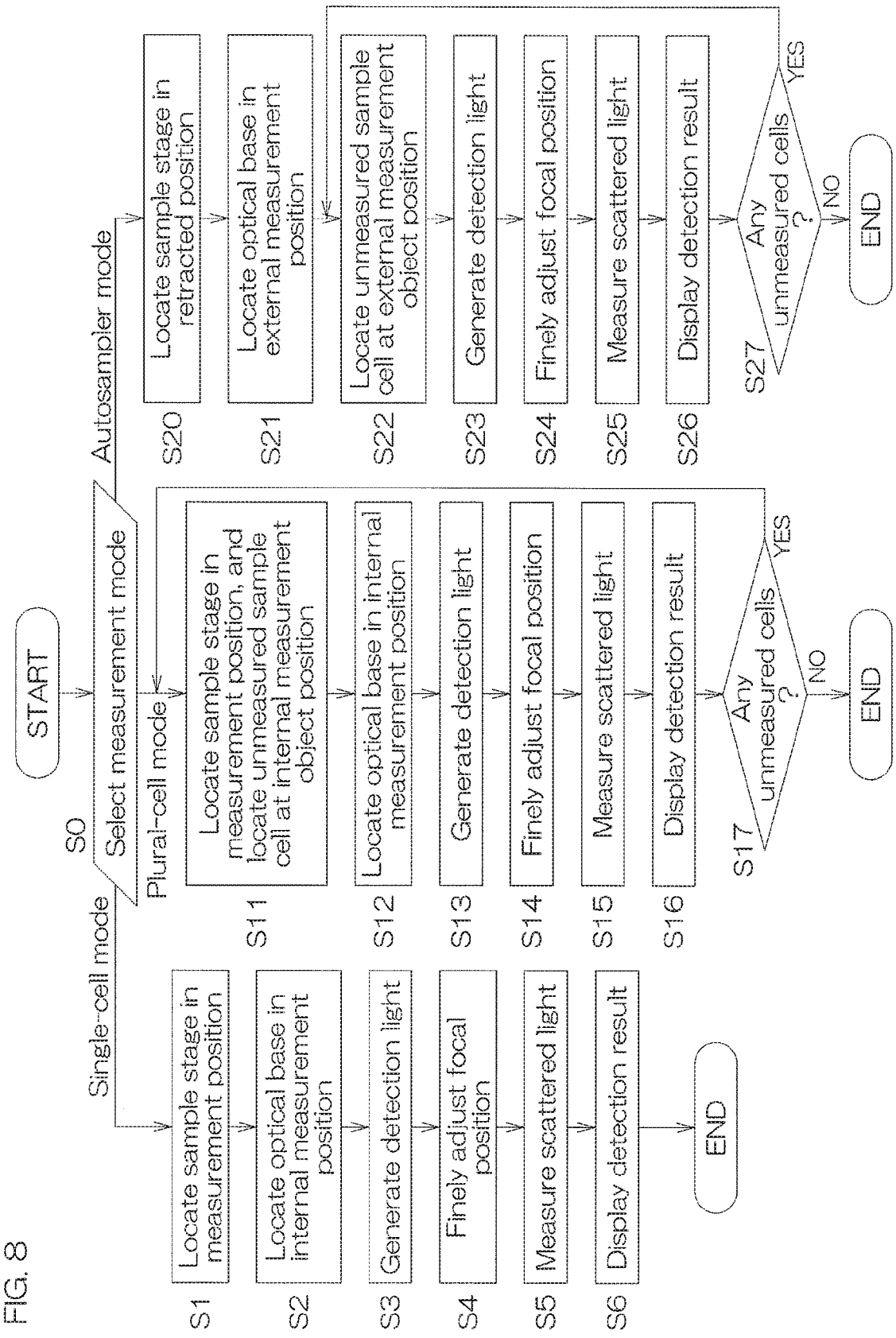
FIG. 8 is a flow chart for explaining operations to be performed for measurement with the use of the optical measurement apparatus.

FIG. 8 is a flow chart for explaining procedures to be performed for the measurement by the user and operations to be performed by the optical measurement apparatus 1. In this example, description will be given to a process in which one of the measurement using the single-cell holder Hs, the measurement using the plural-cell holder Hm and the measurement using the autosampler 40 is performed.

The user operates the operating device 6 of the processor 3, and selects one of a single-cell mode, a plural-cell mode and an autosampler mode from a measurement menu displayed on the display device 5 (Step S0). The single-cell mode is a measurement mode using the single-cell holder Hs, and is selected when the measurement is performed on a single sample cell C held by the single-cell holder Hs (see FIG. 1). The plural-cell mode is a measurement mode using the plural-cell holder Hm, and is selected when the measurement is performed on one or plural sample cells C (in this preferred embodiment, up to 5 sample cells C) held by the plural-cell holder Hm (see FIG. 2). The autosampler mode is a measurement mode using the autosampler 40, and is selected when the measurement is performed on one or plural sample cells C (e.g., up to 50 sample cells C) held by the turntable 42 of the autosampler (see FIG. 3).

If the single-cell mode is selected (Step S0), a single-cell mode selection command is applied from the processor 3 to the controller 90. The controller 90 controls the Y-axis motor 22M to locate the sample stage 12 in the measurement stage position 12A so that the Y-direction position of the sample cell C coincides with the internal measurement object position 30A (Step S1). Further, the controller 90 controls the X-axis motor 21M to locate the optical base 11 in the internal measurement position 11A (Step S2). Thus, the measurement object position 30a of the measurement optical system 30 is located at the internal measurement object position 30A. The controller 90 further controls the light source 31 to generate the light for the detection (Step S3). In this state, as required, the controller 90 controls the X-axis motor 21M to move the optical base 11 along the X-direction to finely adjust the focal position of the projection lens 33 along the X-direction (Step S4). More specifically, the controller 90 finely adjusts the X-direction position of the focal point of the projection lens 33 so that the detector 37 is able to detect a proper amount of light.

A liquid sample S is roughly classified in a dilute sample or a dense sample. The dilute sample is a sample capable of transmitting the detection light. A typical example of the dilute sample is a colloidal solution. The dense sample is a sample substantially incapable of transmitting the detection light. Typical examples of the dense sample include an emulsion and a suspension. In the case of the dilute sample, if the irradiation light L1 is focused on any position in the liquid sample, the scattered light is incident on the detector 37 through the detection lens 34. Therefore, the fine adjustment of the X-direction position of the focal point of the projection lens 33 is not necessarily required. In the case of the dense sample, in contrast, if the irradiation light L1 is focused at a position far inward from an interface between the sample cell C and the sample S, it is impossible to sufficiently guide the scattered light to the detector 37 through the detection lens 34. Therefore, it is necessary to adjust the X-direction position of the focal point of the projection lens 33 at around the interface between the sample cell C and the sample S.

After the necessary adjustment is thus performed, the controller 90 starts acquiring output signals of the detector 37, and sends light amount data indicative of the acquired signals to the processor 3 (Step S5: Scattered light measuring step). Thus, the light amount of the scattered light L2 is measured. The processor 3 displays a detection result based on the received light amount data on the display device 5 (Step S6).

If the plural-cell mode is selected (Step S0), a plural-cell mode selection command is applied from the processor 3 to the controller 90. The controller 90 controls the Y-axis motor 22M to locate the sample stage 12 in the measurement stage position 12A. At this time, the Y-direction position of one of the plural sample cells C held by the plural-cell holder Hm coincides with the internal measurement object position 30A (Step S11). The processor 3 may apply a sample cell specification signal to the controller 90 for selecting one of the sample cells C. In this case, the controller 90 controls the Y-direction position of the sample stage so as to locate the selected sample cell C at the internal measurement object position 30A. Further, the controller 90 controls the X-axis motor 21M to locate the optical base 11 in the internal measurement position 11A (Step S12). Thus, the measurement object position 30a of the measurement optical system 30 is located at the internal measurement object position 30A.

In this state, the controller 90 controls the light source 31 to generate the light for the detection (Step S13). As required, the controller 90 controls the X-axis motor 21M to move the optical base 11 along the X-direction so as to finely adjust the X-direction position of the focal point of the projection lens (Step S14). This fine adjustment is performed for the purpose previously described.

After the necessary adjustment is thus performed, the controller 90 starts acquiring output signals of the detector 37, and sends light amount data indicative of the acquired signals to the processor 3 (Step S15: Scattered light measuring step). Thus, the light amount of the scattered light L2 is measured. The processor 3 displays a detection result based on the received light amount data on the display device 5 (Step S16).

The processor 3 judges if one or more of the plural sample cells C held by the plural-cell holder Hm are left unmeasured (Step S17). If the unmeasured sample cells C are present (YES in Step S17), the processor 3 specifies one of the unmeasured sample cells C and applies a measurement command to the controller 90, such that a process sequence from Step S11 is performed.

This process sequence is repeated until the measurement is performed on all the sample cells C held by the plural-cell holder Hm or on all the sample cells C specified as measurement objects by the processor 3 (No in Step S17).

The autosampler mode is a measurement mode which is activated when the autosampler 40 is connected to the scattered light detector 2. If the autosampler mode is selected (Step S0), an autosampler selection command is applied from the processor 3 to the controller 90. The controller 90 controls the Y-axis motor 22M to retract the sample stage 12 to the retracted stage position 12B (Step S20), and controls the X-axis motor 21M to locate the optical base 11 in the external measurement position 11B (Step S21), such that the measurement object position 30a of the measurement optical system 30 is located at the external measurement object position 30B. Further, the controller 90 controls the θ-axis motor 43M to turn the turntable 42, such that one of the plural sample cells C held by the turntable 42 is located at the external measurement object position 30B (Step S22). The processor 3 may apply a sample cell specification signal to the controller 90 to select one of the sample cells C. In this case, the controller 90 controls the rotational position of the turntable 42 so that the selected sample cell C is located at the external measurement object position 30B.

In this state, the controller 90 controls the light source 31 to generate the light for the detection (Step S23). As required, the controller 90 controls the X-axis motor 21M to move the optical base 11 along the X-direction so as to finely adjust the X-direction position of the focal point of the projection lens (Step S24). This fine adjustment is performed for the purpose previously described.

After the necessary adjustment is thus performed, the controller 90 acquires output signals of the detector 37, and performs an arithmetic operation on the acquired signals for the measurement (Step S25: Scattered light measuring step). The controller 90 sends the result of the arithmetic operation to the processor 3. The processor 3 displays the received arithmetic operation result as the detection result of the scattered light detector 2 on the display device 5 (Step S26). The processor 3 may further analyze the received arithmetic operation result, and display information obtained by the analysis along with the arithmetic operation result on display device 5.

The processor 3 judges if one or more of the plural sample cells C held by the turntable 42 are left unmeasured (Step S27). If the unmeasured sample cells C are present, the processor 3 specifies one of the unmeasured sample cells C and applies a measurement command to the controller 90, such that a process sequence from Step S22 is performed.

This process sequence is repeated until the measurement is performed on all the sample cells C held by the turntable 42 or on all the sample cells C specified as measurement objects by the processor 3 (No in Step S27).

An exemplary optical measurement method to be performed with the use of the optical measurement apparatus 1 according to this preferred embodiment is measurement of particle diameters by the dynamic light scattering method. In this case, the sample S to be contained in the sample cell C is a suspension (or an emulsion) or a solution containing fine particles dispersed in liquid. The particle diameters of the fine particles contained in the sample S are measured.

The fine particles (nanoparticles) contained in the suspension (or the emulsion) or the solution move in Brownian motion, and the speed of the fine particles depends on the size of the fine particles. That is, larger particles move slower, and smaller particles move faster. In the dynamic light scattering method, laser light is inputted to the suspension or the solution, and light scattered from the fine particles is detected. The intensity of the light scattered from the fine particles moving at random in Brownian motion varies with time to be fluctuated. The fluctuation (scattered light intensity fluctuation) depends on the speed of the Brownian motion. That is, scattered light intensity fluctuation attributable to the movement of the larger particles is gentle, and scattered light intensity fluctuation attributable to the movement of the smaller particles is violent. The diffusion coefficient D of the fine particles can be determined by analyzing the autocorrelation function or the frequency spectrum of the fluctuation. With the use of the diffusion coefficient D thus determined, a hydrodynamic diameter (particle diameter d) is able to be calculated from the following Stokes-Einstein equation (1):

$$D = \frac{k_B T}{3\pi \eta d} \qquad (1)$$

d: Particle diameter (nm)
$k_B$: Boltzmann's constant ($1.38 \times 10^{-23}$ J·K$^{-1}$)
T: Absolute temperature (K)
η: Viscosity of dilute liquid (mPa·s)
D: Diffusion coefficient (m$^2$·s$^{-1}$)

A more specific procedure is described below.

Laser light (monochromatic coherent light) is generated from the light source 31, and is applied as the irradiation light L1 to the sample S. Scattered light L2 from the sample S is detected by the detector 37. Thus, scattered light intensity signals are acquired, and stored in the memory 92 of the controller 90. The scattered light intensity signals include a time variation (fluctuation) attributable to the Brownian motion of the fine particles contained in the sample S.

Based on scattered light intensity signals outputted from the detector 37 during a predetermined period of time, the controller 90 calculates an autocorrelation function or a frequency spectrum. The controller 90 sends the autocorrelation function or the frequency spectrum thus calculated to the processor 3. The processor 3 determines a diffusion coefficient D indicating the degree of the fluctuation of the particles based on the autocorrelation function or the frequency spectrum, and substitutes the diffusion coefficient D in the above equation (1) to determine the particle diameter d. In this case, the processor 3 functions as the particle diameter analyzer.

In the light scattering measurement, only light scattered from fine particles present in a predetermined observation volume defined by an incident optical system (including the projection lens 33) and a detection optical system (including the detection lens 34) is detected. The observation volume defined at this time is referred to as scattering volume. Light scattered from fine particles present in a properly defined scattering volume is highly coherent and contributable to highly accurate measurement. Where the fine particles are extremely small or are present at a lower density, the scattered light intensity is able to be increased by increasing the scattering volume, but the coherence factor is liable to be reduced to sacrifice the coherence.

In this preferred embodiment, the scattered light detector 2 is preferably structured such that elements of the measurement optical system 30 are fixed to the optical base 11 and collectively movable. Therefore, the measurement is able to be easily performed under the constant scattering volume conditions whether the measurement object position is the internal measurement object position 30A or the external measurement object position 30B. This allows for highly accurate measurement.

As described above, the optical measurement apparatus 1 according to this preferred embodiment includes the main body base 10, the optical base 11 movably combined with the main body base 10, the measurement optical system 30 fixed to the optical base 11, and the optical base moving mechanism 21 which moves the optical base 11 between the internal measurement position 11A and the external measurement position 11B. The measurement optical system 30 emits the irradiation light L1 to the measurement object position 30a, and detects the scattered light L2 from the measurement object position 30a.

The measurement object position 30a of the measurement optical system 30 is able to be moved between the internal measurement object position 30A and the external measurement object position 30B by moving the optical base 11 between the internal measurement position 11A and the external measurement position 11B. The internal measurement object position 30A is set within the main body base 10, and the external measurement object position 30B is set outside the main body base 10. Therefore, the measurement object position 30a is able to be located within the main body base 10 or outside the main body base 10 by moving the optical base 11. With this arrangement, the measurement is able to be performed on a sample S positioned outside the main body base 10 by connecting the external measurement base 41, 51, 61 or 71 to the main body base 10 according to the need, and positioning the sample S at the external measurement object position 30B on the connected external measurement base 41, 51, 61, 71.

Therefore, the optical measurement apparatus 1 is able to be designed so that minimum components required for fundamental optical measurement are provided on the main body base 10. As required, the functions of the optical measurement apparatus 1 are able to be expanded by connecting the external measurement base 41, 51, 61 or 71 to the main body base 10. Thus, the size of the main body base 10 is able to be reduced to thus correspondingly reduce the footprint of the apparatus 1 and the number of the components of the apparatus 1. This simplifies the construction of the apparatus 1, and reduces the production costs of the apparatus 1.

In addition, the optical measurement apparatus 1 is structured so that the external measurement bases 41, 51, 61, 71 having different expansion functions are optionally combined with the main body base 10 having the fundamental functions. Thus, the optical measurement apparatus 1 is adaptable for a plurality of specifications having different expansion functions and sharing the arrangement design of the main body base 10. This reduces the design costs and the numbers of components dedicated for the respective models. In addition, even if the user purchases an apparatus of a basic model having only the fundamental arrangement without the autosampler 40, the apparatus is able to be retrofit with the autosampler 40 as required. Further, the type of the external measurement base 41, 51, 61, 71 is able to be changed. For example, the apparatus 1 is able to be changed from one model with the beaker holder 50 to another model with the autosampler 40. Since an expansion function is able to be added to the existing apparatus or replaced with the existing expansion function, the user's economic burden is able to be alleviated without the need to purchase another apparatus in addition to or in place of the existing apparatus.

In this preferred embodiment, the scattered light detector 2 includes the sample stage 12 which is supported by the main body base 10 and retains the sample holder H to hold the sample S (more specifically, the sample cell C). The internal measurement object position 30A corresponds to the position of the sample S (more specifically, the sample cell C) held by the sample holder H. Thus, the optical measurement is able to be performed on the sample S within the main body base 10.

In this preferred embodiment, the scattered light detector 2 further includes the sample stage moving mechanism 22 which moves the sample stage 12 relative to the main body base 10. Thus, the sample stage 12 is movable between the measurement stage position 12A defined such that the sample S (more specifically, the sample cell C) held by the sample holder H is located at the internal measurement object position 30A and the retracted stage position 12B defined such that the measurement at the external measurement object position 30B by the measurement optical system 30 is not prevented. Thus, both the optical measurement on the main body base 10 and the optical measurement outside the main body base 10 are able to be properly performed.

In this preferred embodiment, more specifically, the optical base 11 preferably is movable toward and away from the sample S (more specifically, the sample cell C) held by the sample holder H along the X-direction (first direction) (in this preferred embodiment, linearly as seen in plan). On the other hand, the sample stage 12 preferably is movable along the Y-direction (second direction) intersecting the X-direction (in this preferred embodiment, perpendicularly to the X-direction) (in this preferred embodiment, linearly as seen in plan). Therefore, the sample stage 12 is moved along the Y-direction to be retracted to the retracted stage position 12B such that the optical base 11 is able to be moved to the external measurement position 11B.

Since the optical base 11 is movable toward and away from the sample S along the X-direction, the focal position of the measurement optical system 30 is able to be adjusted with respect to the sample S by moving the measurement optical system 30 along the X-direction. That is, the movement direction of the optical base 11 for the fine adjustment of the focal position is same as the movement direction of the optical base 11 for the switching between the internal measurement position 11A and the external measurement position 11B. Therefore, the optical base moving mechanism 21 is able to be shared for the movement of the optical base 11 and for the fine adjustment of the focal position. This simplifies the construction of the apparatus 1 and reduces the size of the apparatus 1 to thus correspondingly reduce the costs.

In this preferred embodiment, in addition, the fine adjustment of the focal position is achieved by moving the entire measurement optical system 30 toward and away from the sample S, so that the scattering volume is kept unchanged or substantially unchanged as described above. Thus, the optical measurement is able to be highly accurately performed.

In this preferred embodiment, the sample holder H is removably attached to the sample stage 12. Therefore, the single-cell holder Hs which holds a single sample S (more specifically, a single sample cell C) and the plural-cell holder Hm which holds a plurality of samples S (more specifically, a plurality of sample cells C) are able to be selectively attached to the sample stage 12 and, as required, replaced with each other. Therefore, the optical measurement on the single sample cell C as well as the sequential optical measurement on the plural sample cells C are able to be achieved with the use of the arrangement provided on the main body base 10. Thus, even the basic arrangement without any of the external measurement bases 41, 51, 61, 71 connected thereto offers convenient optical measurement functions.

In this preferred embodiment, when the plural-cell holder Hm is attached to the sample stage 12, the plural sample cells C held by the plural-cell holder Hm are aligned along the Y-direction (second direction). The sample stage moving mechanism 22 moves the sample stage 12 along the Y-direction so that an arbitrary one of the plural sample cells C is located at the internal measurement object position 30A. Therefore, the plural sample cells C are sequentially exhibited at the internal measurement object position 30A such that the measurement is able to be sequentially performed on the plural sample cells C. The movement direction of the sample stage 12 to switch the sample cells C is same as the direction of the movement of the sample stage 12 between the measurement stage position 12A and the retracted stage position 12B. This obviates the need to move the sample stage 12 along plural directions, and makes it possible to share the sample stage moving mechanism 22 for these purposes. This simplifies the arrangement to move the sample stage 12 and reduces the size of the arrangement, thus correspondingly reducing the production costs of the apparatus.

The external measurement bases 41, 51, 61, 71 are able to be connected to the main body base 10 of the scattered light detector 2 according to the user's demand. Thus, the apparatus 1 is able to be arranged to include an optional external device. More specifically, the scattered light detector 2 may include the optional external device such as the autosampler 40, the beaker holder 50, the test tube holder 60 or the piping holder 70. The external sample holders (42, 52, 62, 72) of these optional external devices each may exhibit the sample S at the external measurement object position 30B. Therefore, the optical measurement is able to be performed with the use of the optional external device by locating the optical base 11 in the external measurement position 11B. More specifically, with the use of the autosampler 40, the optical measurement is able to be sequentially performed on a multiplicity of samples S in a short period of time. With the use of the beaker holder 50 or the test tube holder 60, the optical measurement is able to be performed without the need for transferring the sample S to a dedicated sample cell C. With the use of the piping holder 70, the optical measurement is able to be performed on the sample S flowing through the piping 73.

Figure 9:
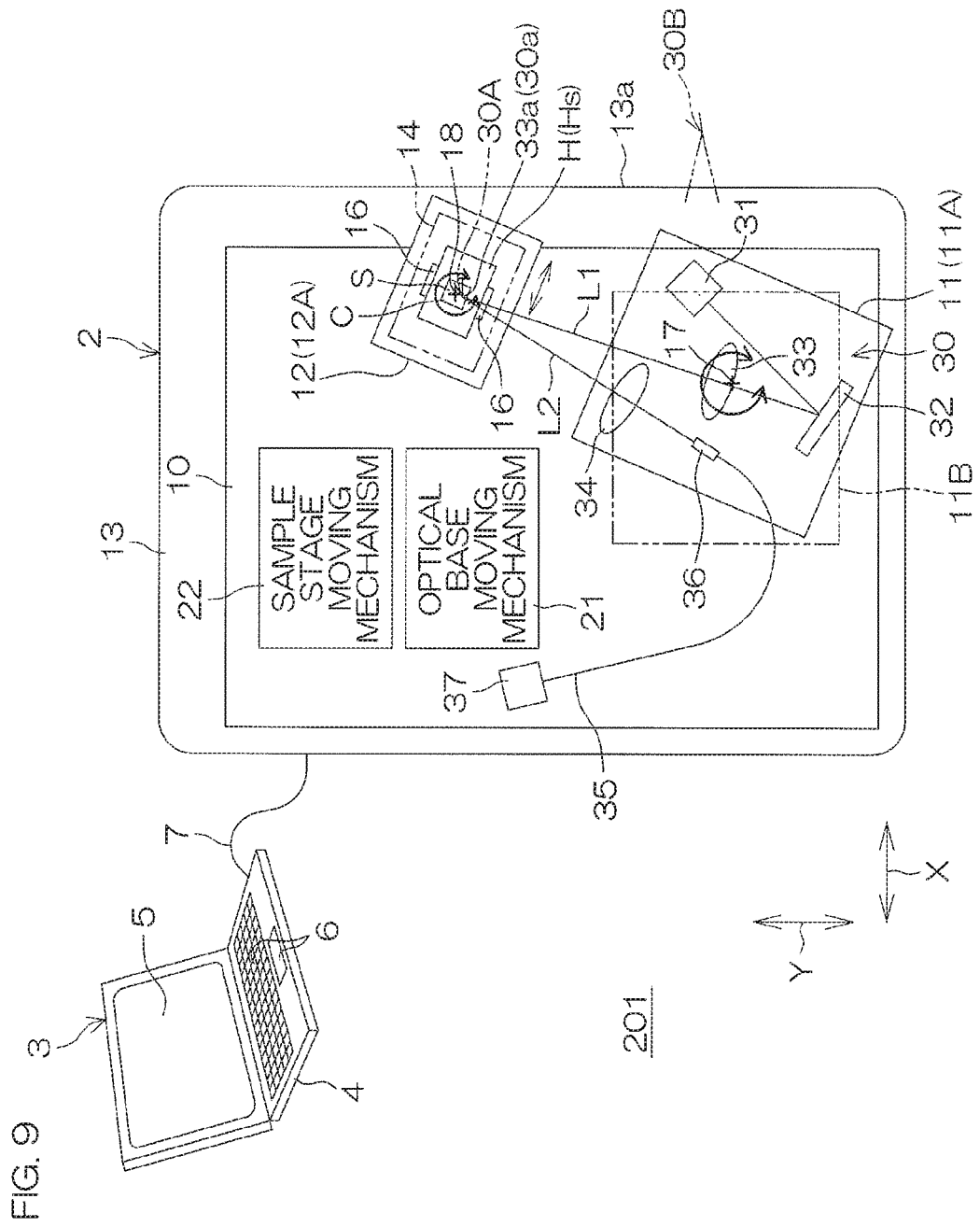
FIG. 9 is a schematic plan view showing the construction of an optical measurement apparatus according to a second preferred embodiment of the present invention.

FIG. 9 is a schematic plan view for explaining the construction of an optical measurement apparatus 201 according to a second preferred embodiment of the present invention. In FIG. 9, components corresponding to those shown in FIG. 1 will be designated by the same reference characters as in FIG. 1.

In this preferred embodiment, the measurement stage position 12A of the sample stage 12 is located so as not to prevent the movement of the optical base 11 to the external measurement position 11B. That is, the measurement stage position 12A is set outside a movement path of the optical base 11 between the internal measurement position 11A and the external measurement position 11B of the optical base 11. Therefore, the sample stage 12 is not required to be retracted from the measurement stage position 12A but may be located at the measurement stage position 12A regardless of whether the optical measurement is performed in the internal measurement mode or in the external measurement mode.

On the other hand, the optical base 11 is supported by the main body base 10 so as to be movable horizontally parallel and rotatable about a vertically extending rotation axis 17. Though not illustrated in detail, the optical base moving mechanism 21 includes a linear driving mechanism and a rotative driving mechanism. For example, the linear driving mechanism may move a linearly movable block supporting the rotative driving mechanism along the X-direction with respect to the main body base 10, and the rotative driving mechanism may rotate the optical base 11 about the rotation axis 17 with respect to the linearly movable block. In this case, the rotation axis 17 is moved along the X-direction as the linearly movable block is moved along the X-direction. Alternatively, the rotative driving mechanism may rotate a rotatable block supporting a linearly movable block about the rotation axis 17 with respect to the main body base 10, and the linear driving mechanism may move the optical base 11 back and forth horizontally with respect to the rotatable block. In this case, the rotation axis 17 is immovable with respect to the main body base 10, and the linear driving mechanism moves the optical base 11 radially toward and away from the rotation axis 17. With either of the arrangements, the optical base 11 is able to be moved horizontally parallel and moved rotationally about the vertical rotation axis 17. Thus, the parallel movement and the rotational movement are able to be combined to move the optical base 11.

The internal measurement object position 30A is set to coincide with the measurement stage position 12A. In this preferred embodiment, the internal measurement object position 30A and the external measurement object position 30B do not align with each other along the X-direction, while the internal measurement object position 30A and the external measurement object position 30B align with each other along the X-direction in the first preferred embodiment described above. The optical base moving mechanism 21 causes the linear driving mechanism and the rotative driving mechanism to guide the optical base 11 to the internal measurement position 11A or the external measurement position 11B by the parallel movement and the rotational movement of the optical base 11. Where the optical base 11 is present in the internal measurement position 11A, the measurement object position 30a of the measurement optical system 30 (the focal position 33a of the projection lens 33) is located at the internal measurement object position 30A. Where the optical base 11 is present in the external measurement position 11B, the measurement object position 30a of the measurement optical system 30 (the focal position 33a of the projection lens 33) is located at the external measurement object position 30B.

The sample stage moving mechanism 22 moves the sample stage 12 to switch the sample cells C when the plural-cell holder Hm is used. The sample stage moving mechanism 22 includes a linear driving mechanism, for example, which moves the sample stage 12 along the direction of alignment of the plural sample cells C. The sample stage moving mechanism 22 may further include a rotative driving mechanism which rotates the sample stage 12 about a vertical rotation axis 18. This makes it possible to adjust the azimuth angle of the sample cell C held by the cell holder H attached to the sample stage 12 with respect to the measurement optical system 30, i.e., the incident angle of the irradiation light L1. There is no need to provide the rotative driving mechanism if the adjustment of the incident angle is not necessary.

This arrangement obviates the need for the retraction of the sample stage 12 whether the measurement is performed in the internal measurement mode or in the external measurement mode. This simplifies the construction of the driving mechanism for the sample stage 12. In the internal measurement mode, the measurement is performed on a sample S retained on the sample stage 12. In the external measurement mode, the measurement is performed on a sample S retained on the external measurement base 41, 51, 61 or 71 connected to the external measurement base connection surface 13a.

Figure 10:
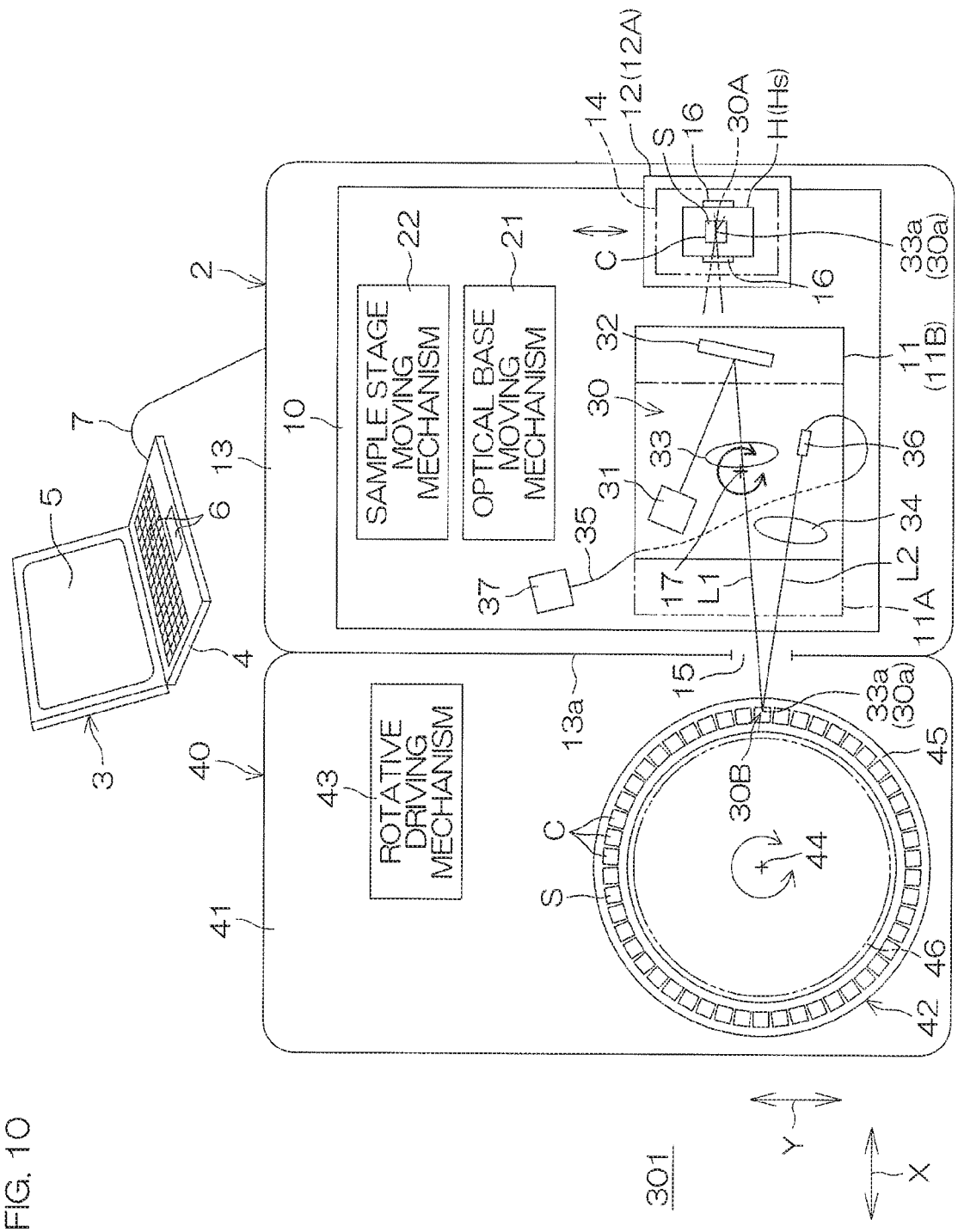
FIG. 10 is a schematic plan view showing the construction of an optical measurement apparatus according to a third preferred embodiment of the present invention.

FIG. 10 is a schematic plan view for explaining the construction of an optical measurement apparatus 301 according to a third preferred embodiment of the present invention, illustrating an arrangement with the autosampler 40 connected thereto. In FIG. 10, components corresponding to those shown in FIG. 3 will be designated by the same reference characters as in FIG. 3.

Also in this preferred embodiment, the measurement object position 30a of the measurement optical system 30 is able to be moved between the internal measurement object position 30A and the external measurement object position 30B with the sample stage 12 located in the measurement stage position 12A. In this preferred embodiment, the measurement stage position 12A is present in the same position as in the first preferred embodiment.

The external measurement base connection surface 13a is defined on a side surface of the housing 13 opposite from the internal measurement object position 30A (i.e., opposite from the sample stage 12) with respect to the optical base 11. In this preferred embodiment, therefore, the autosampler 40 is connected to the side surface opposite from the internal measurement object position 30A (the side surface opposite from the sample stage 12) with respect to the optical base 11.

The optical base 11 is supported by the main body base 10 so as to be movable parallel or substantially parallel along the X-direction and rotatable about the vertically extending rotation axis 17. Though not illustrated in detail, the optical base moving mechanism 21 includes a linear driving mechanism and a rotative driving mechanism. The optical base moving mechanism may have the same specific construction as in the second preferred embodiment described above.

The optical base 11 is movable between the internal measurement position 11A and the external measurement position 11B. In this preferred embodiment, the external measurement position 11B is a position angularly shifted 180 degrees from the internal measurement position 11A about the rotation axis 17. Therefore, the optical base 11 is able to be moved between the internal measurement position 11A and the external measurement position 11B by rotating the optical base 11 about the rotation axis 17. Of course, the external measurement position 11B is not necessarily required to be angularly shifted accurately 180 degrees from the internal measurement position 11A, but may be angularly shifted approximately 180 degrees from the internal measurement position 11A and may be further slightly displaced horizontally (e.g., along the X-direction). When the optical base 11 is present in the internal measurement position 11A, the measurement object position 30a of the measurement optical system 30 (the focal position 33a of the projection lens 33) coincides with the internal measurement object position 30A. When the optical base 11 is present in the external measurement position 11B, the measurement object position 30a of the measurement optical system 30 (the focal position 33a of the projection lens 33) coincides with the external measurement object position 30B.

The range of the linear movement of the optical base 11 (movement mainly along the X-direction) may be smaller than in the first and second preferred embodiments described above. More specifically, the optical base 11 may be movable along the X-direction in a range necessary and sufficient to finely adjust the focal position 33a of the projection lens 33 on the sample S located at the internal measurement object position 30A or the external measurement object position 30B. Where not only the rotational movement but also the linear movement is required for the movement of the optical base 11 between the internal measurement position 11A and the external measurement position 11B, the linear movement range of the optical base 11 may be designed within the range necessary for that linear movement.

The sample stage moving mechanism 22 moves the sample stage 12 to switch the sample cells C when the plural-cell holder Hm is used. The sample stage moving mechanism 22 includes a linear driving mechanism, for example, which linearly moves the sample stage 12 along the Y-direction (along the direction of the alignment of the plural sample cells C).

This arrangement obviates the need for the retraction of the sample stage 12 whether the measurement is performed in the internal measurement mode or in the external measurement mode. This simplifies the construction of the driving mechanism for the sample stage 12.

While the preferred embodiments of the present invention have thus been described, the present invention may be embodied in other ways. In the preferred embodiments described above, the dynamic light scattering method is described as the exemplary optical measurement method, but the present invention is applicable to a static light scattering method. Further, the construction of the measurement optical system 30 may be properly modified for other optical measurement method. Of course, the measurement is not limited to measurement of the particle diameter.

In the first preferred embodiment described above, the sample stage 12 is movable horizontally (along the Y-direction) to be shifted between the measurement stage position 12A and the retracted stage position 12B, but may be moved vertically (e.g., downward) to be retracted from the measurement stage position 12A. Further, the sample stage 12 may be rotated to be retracted from the measurement stage position 12A.

In the first preferred embodiment described above, the optical base 11 is movable along the X-direction, and the sample stage 12 is movable along the Y-direction. However, the movement of the optical base 11 is not necessarily one-directional movement. Further, the sample stage 12 may not be moved for the retraction. The apparatus may have a construction other than those shown in FIGS. 9 and 10. For example, the sample stage 12 may be detachable. The sample stage 12 may be detached when the optical base 11 is located in the external measurement position 11B. Further, the sample stage 12 may be immovable, and the optical base 11 may be movable along a direction other than the X-direction (e.g., along a vertical direction) as well, so that the optical base 11 is able to be moved around the sample stage 12 to the external measurement position 11B.

The autosampler 40 may include a plurality of turntables 42 vertically stacked. In this case, the optical base moving mechanism 21 may move the optical base 11 not only along the X-direction but also in vertically upward and downward directions. The autosampler 40 may further include a lift mechanism which moves the stacked plural turntables 42 vertically up and down. With this arrangement, the sample cells C held by the plural turntables are able to be sequentially exhibited at the external measurement object position 30B. Thus, the measurement is able to be sequentially performed on a greater number of samples S.

The autosampler 40 is not necessarily required to include the turntable 42. That is, the autosampler 40 may sequentially exhibit plural sample cells C at the external measurement object position 30B by a mechanism which moves the plural sample cells C along a circular or noncircular path. The path along which the samples S are moved may be an endless path (circulating path) or may be an open-ended path. The moving mechanism may be a conveyor (more specifically, a belt conveyor).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical measurement apparatus comprising:
   a main body base;
   an optical base movably combined with the main body base;
   a measurement optical system fixed to the optical base;
   a housing accommodating the main body base, the optical base, and the measurement optical system, the housing including an external measurement base connection surface located on an outer surface of the housing; and
   an optical base moving mechanism which moves the optical base relative to the main body base between an internal measurement position defined such that a measurement object position of the measurement optical system coincides with an internal measurement object position within the main body base and within the housing and an external measurement position defined such that the measurement object position of the measurement optical system coincides with an external measurement object position outside the main body base and outside the housing; wherein
   the external measurement object position is set within an external measurement base that is separate from the main body base and connectable to the external measurement base connection surface of the housing such that the external measurement object position is located on an opposite side of the external measurement base connection surface from an inside of the housing.

2. The optical measurement apparatus according to claim 1, further comprising a sample stage which is supported by the main body base and retains a sample holder to hold a sample, wherein the internal measurement object position corresponds to a position of the sample held by the sample holder.

3. An optical measurement apparatus comprising:
   a main body base;
   an optical base movably combined with the main body base;
   a measurement optical system fixed to the optical base;
   an optical base moving mechanism which moves the optical base relative to the main body base between an internal measurement position defined such that a measurement object position of the measurement optical system coincides with an internal measurement object position within the main body base and an external measurement position defined such that the measurement object position of the measurement optical system coincides with an external measurement object position outside the main body base;
   a sample stage which is supported by the main body base and retains a sample holder to hold a sample, wherein the internal measurement object position corresponds to a position of the sample held by the sample holder; and
   a sample stage moving mechanism which moves the sample stage relative to the main body base between a measurement stage position defined such that the sample held by the sample holder is located at the internal measurement object position and a retracted stage position defined such that measurement at the external measurement object position by the measurement optical system is not prevented.

4. The optical measurement apparatus according to claim 3, wherein
   the optical base moving mechanism moves the optical base between the internal measurement position and the external measurement position along a first direction along which the optical base is moved toward and away from the sample held by the sample holder; and the sample stage moving mechanism moves the sample stage between the measurement stage position and the retracted stage position along a second direction intersecting the first direction.

5. The optical measurement apparatus according to claim 4, wherein the sample holder holds a plurality of samples in alignment along the second direction on the sample stage; and the sample stage moving mechanism moves the sample stage so that an arbitrary one of the plural samples is located at the internal measurement object position.

6. The optical measurement apparatus according to claim 1, further comprising:

an external sample holder which is supported by the external measurement base, and holds a sample so as to exhibit the sample at the external measurement object position when the external measurement base is attached to the main body base.

7. An optical measurement apparatus comprising:

a main body base;

an optical base movably combined with the main body base;

a measurement optical system fixed to the optical base;

an optical base moving mechanism which moves the optical base relative to the main body base between an internal measurement position defined such that a measurement object position of the measurement optical system coincides with an internal measurement object position within the main body base and an external measurement position defined such that the measurement object position of the measurement optical system coincides with an external measurement object position outside the main body base;

an external measurement base connectable to the main body base; and an external sample holder which is supported by the external measurement base, and holds a sample so as to exhibit the sample at the external measurement object position when the external measurement base is attached to the main body base;

wherein the external sample holder is structured to hold a plurality of samples; and the optical measurement apparatus further comprises an external sample moving mechanism which moves the external sample holder on the external measurement base to exhibit an arbitrary one of the plural samples at the external measurement object position.

8. An optical measurement apparatus comprising:

a main body base;

an optical base movably combined with the main body base;

a measurement optical system fixed to the optical base;

an optical base moving mechanism which moves the optical base relative to the main body base between an internal measurement position defined such that a measurement object position of the measurement optical system coincides with an internal measurement object position within the main body base and an external measurement position defined such that the measurement object position of the measurement optical system coincides with an external measurement object position outside the main body base;

an external measurement base connectable to the main body base; and an external sample holder which is supported by the external measurement base, and holds a sample so as to exhibit the sample at the external measurement object position when the external measurement base is attached to the main body base; wherein the external sample holder is structured to hold a beaker or a test tube including the sample or to hold a piping member through which the sample flows in a fluid form.

9. The optical measurement apparatus according to claim 1, wherein the measurement optical system includes:

a light source which generates light to be applied to the measurement object position;

a projection lens which concentrates the light generated by the light source on the measurement object position; and a detection lens on which light scattered from the measurement object position is incident.

10. The optical measurement apparatus according to claim 1, wherein the measurement optical system emits light to the measurement object position, detects light scattered from the measurement object position, and outputs a detection signal corresponding to the detected scattered light; and the optical measurement apparatus further comprises a particle diameter analyzer which analyzes particle diameters of particles in a sample placed at the measurement object position of the measurement optical system based on the detection signal outputted by the measurement optical system.

11. An optical measurement method using an optical measurement apparatus including a main body base, an optical base movably combined with the main body base, a measurement optical system fixed to the optical base, and a housing accommodating the main body base, the optical base, and the measurement optical system, the housing including an external measurement base connection surface located on an outer surface of the housing, the optical measurement method comprising:

moving the optical base relative to the main body base to locate a measurement object position of the measurement optical system at an external measurement object position outside the main body base and outside the housing;

locating a sample at the external measurement object position; and acquiring a detection signal from the measurement optical system with the measurement object position of the measurement optical system being located at the external measurement object position and with the sample being located at the external measurement object position; wherein the external measurement object position is set within an external measurement base that is separate from the main body base and connectable to the external measurement base connection surface of the housing such that the external measurement object position is located on an opposite side of the external measurement base connection surface from an inside of the housing.

12. An optical measurement method using an optical measurement apparatus including a main body base, an optical base movably combined with the main body base, and a measurement optical system fixed to the optical base, the optical measurement method comprising:

moving the optical base relative to the main body base to locate a measurement object position of the measurement optical system at an external measurement object position outside the main body base;

locating a sample at the external measurement object position; and acquiring a detection signal from the measurement optical system with the measurement object position of the measurement optical system being located at the external measurement object position and with the sample being located at the external measurement object position; wherein the measurement object position of the measurement optical system is movable between an internal measurement object position set within the main body base and the external measurement object position by moving the optical base relative to the main body base;

the optical measurement apparatus includes a sample stage which is supported by the main body base and retains a sample holder to hold the sample; and the optical measurement method further comprises retracting the sample stage from a measurement stage position defined such that the sample is exhibited at the internal measurement object position.

13. The optical measurement method according to claim 11, wherein the measurement optical system emits light to the measurement object position, detects light scattered from the measurement object position, and outputs a detection signal corresponding to the detected scattered light; and the optical measurement method further comprises analyzing particle diameters of particles in the sample based on the signal outputted by the measurement optical system.

* * * * *